United States Patent [19]
Ono et al.

[11] Patent Number: 6,117,483
[45] Date of Patent: Sep. 12, 2000

[54] METHOD FOR STORING A POLYESTER FILM FOR A MAGNETIC RECORDING MEDIUM, AND A METHOD FOR PRODUCING A MAGNETIC RECORDING MEDIUM

[75] Inventors: Masaaki Ono, Otsu; Katsuya Okamoto, Hisakata; Tadashi Harada, Otsu, all of Japan

[73] Assignee: Toray Industries, Inc., Tokyo, Japan

[21] Appl. No.: 09/398,584

[22] Filed: Sep. 17, 1999

[30] Foreign Application Priority Data

Sep. 17, 1998 [JP] Japan ................................. 10-262832

[51] Int. Cl.$^7$ ........................................................ B05D 5/12
[52] U.S. Cl. .......................... 427/129; 427/128; 427/132; 427/250; 427/314; 427/327
[58] Field of Search ..................................... 427/129, 250, 427/128, 132, 314, 327

[56] References Cited

U.S. PATENT DOCUMENTS 4,540,618  9/1985  Suzuki et al. .
4,581,245  4/1986  Nakamura et al. .

FOREIGN PATENT DOCUMENTS 50-58315  5/1975  Japan .
356041527A  4/1981  Japan .

*Primary Examiner*—Bernard Pianalto
*Attorney, Agent, or Firm*—Austin R. Miller, Esq.

[57] ABSTRACT

A method for storing a polyester film for a magnetic recording medium, characterized in that a polyester film for a magnetic recording medium with a surface roughness Ra of 6 nm or less on the surface A on one side is stored substantially in a storing atmosphere having a storing temperature kept in a range from 10° C. to 35° C. The polyester film stored according to this storing method is used as a base film for producing magnetic tapes.

8 Claims, No Drawings

METHOD FOR STORING A POLYESTER FILM FOR A MAGNETIC RECORDING MEDIUM, AND A METHOD FOR PRODUCING A MAGNETIC RECORDING MEDIUM

BACKGROUND OF THE INVENTION

1. Field of the Invention

The present invention relates to a method for storing a polyester film for use as a magnetic recording medium, and a method for producing a magnetic recording medium by forming a thin ferromagnetic metallic film on the surface of the polyester film stored according to the storing method.

The polyester film of this invention is preferably used as a base film of a video cassette tape or data storage tape, etc. used for recording digital data.

2. Description of the Prior Art

The residential and commercial use digital video tape (magnetic recording medium) which began to be practically used in 1995 is produced by forming a thin ferromagnetic metallic film of cobalt (Co) on a 6 to 7 $\mu$m thick base film by vacuum evaporation, and furthermore coating the surface with a diamond-like carbon film. The digital video tape is used for a mini cassette of a digital video (DV) apparatus. A camera-integrated video cassette recorder mounted with this cassette allows one-hour picture recording in its basic specification (standard definition (SD)).

The digital video cassette (DVC) was the first home use digital video cassette in the world, and has the following advantages, being highly evaluated on the market: it allows an enormous volume of information to be recorded in its small body; will resist degradation in image and sound quality even after years, since its signals are little degraded; its allows high quality image and sound to be enjoyed since it is not susceptible to noise interference, and is little degraded in image even after repeated dubbing.

The films which are used as the base films of magnetic recording media include the following:

(A) A polyester film comprising a polyester film, a polymer blend deposited at least on one side of the film, and a discontinuous film which is mainly composed of fine particles with a particle size of 50 to 500 Å and formed on the surface of the polymer blend and which contains a water soluble polyester copolymer, to form fine projections on the discontinuous film by the fine particles. This polyester film is disclosed in Japanese Patent Publication (Kokoku) No. Sho 63-57238 (U.S. Pat. No. 4,568,600); or (B) A laminated film in which a layer is made of a thermoplastic resin (e.g., a polyester) and a layer is made of a thermoplastic resin (e.g., a polyester) containing fine particles, as disclosed in Japanese Patent Publication (Kokoku) Hei 1-26338 (U.S. Pat. No. 4,550,049).

However, any of these polyester base films is likely to precipitate an oligomer in the polyester film onto a surface while it is stored after production, until the time when it is used for producing a magnetic recording medium.

The tape (magnetic recording medium) prepared by using a base film with an oligomer precipitated on a film surface is confronted with a problem that undesirable block-shaped portions devoid of image appear on a screen when a recorded image is reproduced. These are called "drop outs".

SUMMARY OF THE INVENTION

An object of the present invention is to provide a method for storing a base film to allow the production of a magnetic recording medium having less drop-outs. Another object is to provide a method for producing a magnetic recording medium having less drop-outs.

The storing method of the present invention to achieve the object of the present invention is as described below.

A method for storing a polyester film for a magnetic recording medium, characterized in that a polyester film for a magnetic recording medium having a surface roughness Ra of 6 nm or less on the surface A on one side is stored substantially in a storing atmosphere having a storing temperature kept in a range from 10° C. to 35° C.

In the present invention, it is preferable that the storing temperature T (° C.) and the number days D of storage satisfy the relation:

$$\text{Log } D \leq -0.014 \times T + 1.903$$

least in a range from 30° C. to 35° C. in said storing temperature range.

In the present invention, it is preferable that said polyester film has a width of 400 mm or more and a length of 10,000 m or more and is wound around a bobbin as a film package when stored in said storing atmosphere.

In the present invention, it is preferable that said polyester film has a thickness of less than 7.0 $\mu$m. In the present invention, it is preferable that said polyester film is made of polyethylene terephthalate or polyethylene-2,6-naphthalate.

In the present invention, said storing includes storage at a stationary position and/or storage during transport.

The method for producing a magnetic recording medium of the present invention to achieve the object of the present invention is as described below.

A method for producing a magnetic recording medium, comprising the step of forming a thin ferromagnetic metallic film on said surface A on one side of the polyester film stored according to the method for storing a polyester film for a magnetic recording medium of the present invention.

In the present invention, it is preferable that said thin ferromagnetic metallic film is formed by vacuum evaporation.

DESCRIPTION OF THE PREFERRED EMBODIMENTS

The surface roughness Ra (the measuring method is described later) of the surface A on one side of the polyester film in the present invention must be 6 nm or less. If the surface roughness Ra is more than 6 nm, the surface of the thin ferromagnetic metallic film formed on the surface A becomes so rough that the output characteristic of the magnetic tape declines.

It is preferable that the surface roughness Ra is in a range from 2 nm to 5 nm. If the surface roughness Ra of the film is less than 2 nm, the thin ferromagnetic metallic film may be abraded by the video head during recording and reproduction.

In the present invention, the polyester film must be stored in a storing atmosphere having a storing temperature kept in a range from 10° C. to 35° C. It is more preferable that the storing temperature is kept in a range from 15° C. to lower than 30° C. The film stored in a storing temperature of lower than 10° C. is likely to have water condensed as dew on the surface. When a ferromagnetic metal is deposited on the film surface by vacuum evaporation, the water condensed as dew is gasified, causing the deposited film to grow poorly. The poor growth of the deposited film increases the appearing frequency of drop-outs (the measuring method is described later) of the produced magnetic tape.

The film stored with the storing temperature kept higher than 35° C. is likely to have an oligomer in the film precipitated on its surface. When a ferromagnetic metal is deposited on the film surface by vacuum evaporation, the precipitated oligomer forms coarse projections on the deposited film. The coarse projections increase the appearing frequency of drop-outs of the produced magnetic tape.

In the present invention, "substantially" in the description of "stored substantially in a storing atmosphere having a storing temperature kept in a range from 10° C. to 35° C." means that even if the film package may be temporarily placed in an atmosphere deviating from the temperature range from 10° C. to 35° C. when the storing style is changed, it can be overlooked if the appearing frequency of drop-outs (the measuring method is described later) does not increase even if the film package is exposed to the nonconforming temperature.

In the present invention, it is preferable that the storing temperature T (° C.) and the number of storing days D satisfy a relation of $$\text{Log } D \leq -0.014 \times T + 1.903 \qquad (I)$$

at least in a range from 30° C. to 35° C. in said storing temperature range.

This "at least" expression means that it is preferable that the storing temperature T (° C.) and the number of storing days D satisfy the above relation in the entire storing temperature range from 10° C. to 35° C.

The typical storing style in the present invention is storage at a stationary position and/or storage during transport.

A form of the stored film is a film package containing a predetermined quantity of the film, and a typical form of the film package is a film roll in which the film is wound around a core (bobbin).

One or more film packages are placed in a warehouse as they are or after having been packaged with a wrapping material, or are contained in a case, to be stored.

Plural film rolls may be contained in a rack having a structure in which both the ends of the core (bobbin) of each roll are suspended and supported, with the entire rack packaged. The packaged rack is stored in a warehouse or contained in a case.

The wrapping material used for packaging the film roll or the rack is, typically, a flexible sheet, for example, a polyethylene film.

When the film package is stored in a warehouse which is entirely kept at the storing temperature, the storing atmosphere is the atmosphere in the warehouse. When the film package is stored in a section of a warehouse, which section is kept at the storing temperature, the storing atmosphere is the atmosphere in the section.

When the film package is stored in a case which is kept at the storing temperature, the storing atmosphere is the atmosphere in the case.

The warehouse can be a warehouse formed as a fixed building (or a temporary building), or a cargo chamber of a movable transport means such as an automobile, train, ship or airplane, etc.

The case can be a container, box or bag, etc. which is placed at a certain position or can be moved.

To keep the storing atmosphere at the storing temperature, a temperature controller is used. The storing temperature can be controlled by an air conditioning method in which the temperature of the gas (usually air) in the atmosphere is directly controlled by a temperature controller, or can be controlled indirectly by controlling the temperature of the object surrounding to form the storing atmosphere.

In the present invention, it is preferable that the polyester film has a width of 400 mm or more and a length of 10,000 m or more, and that it is wound around a bobbin as a film roll, when stored in the storing atmosphere. If the width is less than 400 mm or if the length is less than 10,000 m, when the magnetic tape is produced by depositing a ferromagnetic metal on the polyester film by vacuum evaporation, the product yield efficiency declines.

In the present invention, it is preferable that the thickness of the polyester film is less than 7.0 $\mu$m. It is more preferable that the thickness is in a range from 4.0 $\mu$m to 6.5 $\mu$m. It is not preferable that the thickness of the base film is more than 6.5 $\mu$m, especially more than 7.0 $\mu$m, since the recordable time of one cassette tape obtained by using the magnetic tape produced from the polyester film becomes less than one hour. It is not preferable that the thickness of the base film is less than 4.0 $\mu$m, since the strength of the magnetic tape produced by using the base film becomes so low that the tape is likely to be damaged, for example, folded or cut while it runs in a video camera or video tape recorder.

In the present invention, the polyester used to form the polyester film is only required to be a polyester capable of forming a high strength film by molecular orientation. It is preferable that the polyester is polyethylene terephthalate or polyethylene-2,6-naphthalate. Polyethylene terephthalate or polyethylene-2,6-naphthalate containing 80% or more of ethylene terephthalate or ethylene naphthalate is more preferable.

The comonomers of the polyester copolymer other than ethylene terephthalate or ethylene naphthalate, which can be used in this invention, include diols such as diethylene glycol, propylene glycol, neopentyl glycol, polyethylene glycol, p-xylylene glycol and 1,4-cyclohexanedimethanol, dicarboxylic acids such as adipic acid, sebacic acid, phthalic acid, isophthalic acid, and 5-sodiumsulfoisophthalic acid, polyfunctional dicarboxylic acids such as trimellitic acid and pyromellitic acid, p-oxyethoxybenzoic acid, etc.

The polyester can also be mixed with 5 wt % or less of at least one of alkali metal sulfonate derivatives unreactive with the polyester, polyalkylene glycols substantially insoluble in the polyester, etc.

In the present invention, it is preferable that the three-dimensional surface roughness SRa (the measuring method is described later) of the surface B on the other side of the film (the surface on the side opposite to the surface A) of the polyester film is in a range from 8 nm to 35 nm. A range from 10 nm to 25 nm is more preferable.

The produced wide polyester film is slit by a slitter into plural films respectively with a predetermined width, for example, 550 mm. Where the three-dimensional surface roughness SRa is in this range, when the slit films are wound to form film rolls, film rolls with good winding form can be easily obtained.

When the magnetic tape is produced, a thin ferromagnetic film is formed on the surface A on one side of the film unwound from the film roll, and the laminated film is wound again to form a film roll. Where the three-dimensional surface roughness SRa is in this range, the undulating deformation of the thin ferromagnetic film formed by transfer from the roughness of the surface B on one side can be minimized in the formed film roll.

In the present invention, it is preferable that the three-dimensional surface roughness SRz (the measuring method is described later) on the surface B on the other side (the surface on the side opposite to the surface A) of the polyester film is in a range from 100 nm to 700 nm. A more preferable range is 140 nm to 550 nm.

Where the three-dimensional surface roughness SRz is in this range, the winding form of the film roll formed after slitting becomes good. Furthermore, the undulating deformation of the thin ferromagnetic film formed by transfer from the roughness of the surface B on one side is minimized in the film roll formed after forming the thin ferromagnetic film.

The method for producing a magnetic recording medium of the present invention is described below.

A magnetic recording medium is produced by forming a thin ferromagnetic metallic film on the surface A on one side with a surface roughness Ra of 6 nm or less, of a film stored according to the above mentioned method for storing a polyester film for a magnetic recording medium of the present invention.

The ferromagnetic metals which can be preferably used here include iron, cobalt, nickel and their alloys. The thin ferromagnetic metallic film can be preferably formed by vacuum evaporation.

It is preferable that the thickness of the formed thin ferromagnetic metallic film is 100 to 300 nm. The thin ferromagnetic metallic film can also be coated with an about 10 nm thick diamond-like carbon film which can be further coated with a lubricant such as a fluorine compound.

The surface B on the other side may be coated with a solution consisting of solid particles of carbon black, etc. and a binder of a polyurethane resin, or epoxy resin, etc., and further containing, as required, various additives such as a silicone resin, to form a back coat layer. It is preferable that the thickness of the back coat layer is about 0.3 $\mu$m to about 1.5 $\mu$m.

As the solid particles, binder and additives, those stated in the above-cited publicly known patents can be used.

EXAMPLES

Examples of the invention and comparative examples are described below.

The physical properties in the following examples were measured according to the following methods.

(a) Surface Roughness Ra

The surface roughness Ra is the arithmetical mean roughness specified in JIS B 0601-1994 [ISO-468, 3274, 4287/1, 4287/2, and 4288]. It is measured by a stylus type surface roughness tester in the machine direction of the film.

The stylus has a radius of 2 to 5 $\mu$m, and the cut-off value is 0.25 mm. The evaluation length is about 5 mm.

(b) Three-Dimensional Surface Roughness SRa and Three-Dimensional Surface Roughness SRz The respective values are measured by an optical stylus type (critical angle focus error detection type) three-dimensional roughness tester (ET-30HK) produced by Kosaka Kenkyusho.

The three-dimensional surface roughness SRa is the arithmetical mean plane roughness corresponding to the surface roughness Ra specified in JIS B 0601.

The three-dimensional surface roughness SRz is the ten-point mean plane roughness corresponding to the surface roughness Rz specified in JIS B 0601. In this case, the average plane of the portion extracted as the reference area from the roughness curved surface is identified as the reference plane, and the roughness SRz value is obtained as the distance between the mean value of the heights of the highest crest to the fifth crest and the mean value of the depths of the deepest trough to the fifth trough.

A specimen is prepared by depositing aluminum on the surface to be measured of the film by evaporation.

The measuring direction is the transverse direction. The cut-off value is 0.08 mm, and the measuring length is 0.1 to 0.25 mm. The feed pitch is 0.2 $\mu$m, and the measuring speed is 20 $\mu$m/sec. Measurement is effected along 100 lines. Values are measured in nm.

(c) Frequency of Drop-Outs (DOs)

The property of a produced magnetic tape (DVC tape) is evaluated by a marketed camera-integrated digital video tape recorder in an LP mode, and a picture is recorded and reproduced in a silent room, to count the frequency of drop-outs (DOs) detected.

The produced DVC tape is set in the marketed camera-integrated digital video tape recorder, and run to record a picture. If the recorded picture is reproduced, it can happen that the image reproduced on the screen lacks partially in squares (devoid of any image) (drop-outs). One square may appear, or plural squares may appear independently or continuously. Furthermore, they may appear as a larger square or as an L shape figure, etc.

The appearing frequency of drop-outs (DOs) is counted irrespective of the forms and numbers of the drop-outs, and a case where any drop-out phenomenon appears to remain for about one second within a reproducing time of 1 minute is counted as a drop out.

Example 1

Raw materials "A" and "B" were coextruded as a laminate. Raw material A had been obtained by providing polyethylene terephthalate not substantially containing any inactive particles but containing 0.03 wt % of silica with an average particle size of 60 nm. Raw material B had been obtained by providing the same polyethylene terephthalate with 0.20 wt % of aluminum silicate with an average particle size of 300 nm. Raw materials "A" and "B" co-extruded at a thickness ratio of 5:1, and the laminate was brought into contact with a cooling drum, and formed into a sheet. It was stretched to 3.0 times at 110° C. in the machine direction by rolling, coated on the surface A on one side with an aqueous solution of the following composition and having a solid content of 20 mg/m$^2$, stretched in the transverse direction, and heat-treated, to produce a base film. The base film was a laminated polyester film consisting of the raw material A layer and the raw material B layer.

Composition of the aqueous solution:

| | |
|---|---|
| Methyl cellulose | 0.10 wt % |
| Water soluble polyester(*) | 0.30 wt % |
| Aminoethyl silane coupling agent | 0.01 wt % |
| Very fine silica with an average particle size of 16 nm | 0.03 wt % |

(*) Said water soluble polyester was a 1:1 copolymer consisting of acids (consisting of 70 mol % of terephthalic acid and 30 mol % of 5-sodiumsulfoisophthalic acid) and ethylene glycol.

The film coated with the aqueous solution was stretched in the transverse direction at 102° C. to 4.2 times by use of a stenter, and heat-treated at 215° C., and wound on an intermediate spool. The film wound around the intermediate spool was unwound and slit into 550 mm wide films by a slitter, and the slit films were wound around cylindrical cores at a length of 12,000 m, to form film rolls. The films had a thickness of 6.3 $\mu$m. The slitting was effected in an atmosphere of 15° C. to 25° C.

The produced film rolls were packaged by covering with a polyethylene film, and contained in a corrugated fiberboard box. The packing into the corrugated fiberboard box was carried out in an atmosphere of 17° C. to 25° C.

The corrugated fiberboard box containing the film rolls was carried into a warehouse controlled at a storing temperature of 22° C.±3° C. (T=22), and stored for 30 days (D=30).

The corrugated fiberboard box stored in the warehouse was moved into a place where a metallizing apparatus was installed, and unpacked. Any of the film rolls was taken out and set in the metallizing apparatus. The polyester film unwound from the film roll was metallized on the surface A in vacuum, to form a 150 nm thick cobalt-oxygen film.

On the formed cobalt-oxygen film, a 10 nm thick diamond-like carbon film was formed by sputtering, and a fluorine-containing fatty acid ester based lubricant was applied on it, to have a thickness of 3 nm.

In succession, a back coat layer consisting of carbon black, polyurethane and silicone was formed to have a thickness of 500 nm.

Then, the film was slit into 6.35 mm wide tapes by a slitter, and they were reeled, to produce magnetic tapes (DVC video tapes, LP mode).

The properties of the obtained polyester film and the properties of the magnetic tapes are shown in Table 1. The SRa and SRz on the surface B of the polyester film were 20 nm and 270 nm respectively.

The storing temperature (T) and the number of storing days (D) in this example satisfied the relation of said formula (I).

Example 2

The corrugated cardboard box containing the polyester film produced in Example 1 was carried into a reefer container controlled at a storing temperature of 19° C.±3° C. (T=19), instead of being stored in a warehouse, and the reefer container was transported to a place where a metallizing apparatus was installed, taking 35 days (D=35).

The transported film rolls were used for producing magnetic tapes (DVC video tapes, LP mode).

The properties of the obtained polyester film, the storing temperature during transport (transport temperature), and the properties of the magnetic tapes are shown in Table 1. The SRa and SRz of the surface B of the polyester film were 20 nm and 270 nm respectively.

The storing temperature (T) and the number of storing days (D) in this example satisfied the relation of the formula (I).

Example 3

A base film was produced as described for Example 1, except that the same raw material as the raw material A used in Example 1 except that the silica with an average particle size of 60 nm was not contained was used. The obtained film was slit into 6.35 mm wide magnetic tapes as described for Example 1.

The properties of the obtained polyester film, the storing temperature and the properties of the magnetic tapes are shown in Table 1. The SRa and SRz of the surface B of the polyester film were 20 nm and 270 nm respectively.

Example 4

The base film in this example was produced as described for Example 1, except that polyethylene-2,6-naphthalate was used instead of polyethylene terephthalate, that the aluminum silicate content in the raw material B was 1.1 wt %, that the longitudinal stretching temperature was 135° C., that the longitudinal stretching ratio was 5.0 times, that the lateral stretching temperature was 135° C., that the lateral stretching ratio was 6.5 times, and that the heat treatment temperature was 200° C. As a result, film rolls with 4.2 μm thick, 550 mm wide and 12,000 m long films wound were produced. From the film rolls, 6.35 mm wide magnetic tapes were produced.

The properties of the obtained polyester film, the storing temperature, and the properties of the magnetic tapes are shown in Table 1. The SRa and SRz of the surface B of the polyester film were 22 nm and 280 nm respectively.

Example 5

The corrugated fiberboard box containing the polyester film once stored in the warehouse of Example 1 was moved into a reefer container controlled at a storing temperature of 19° C.±3° C. (T=19). The reefer container was transported to a place where a metallizing apparatus was installed, taking 35 days (D=35). The transported film rolls were used to produce magnetic tapes (DVC video tapes, LP mode) as described for Example 1.

The properties of the obtained polyester film, the storing temperature, and the storing temperature during transport (transport temperature) and the properties of the magnetic tapes are shown in Table 1. The SRa and SRz of the surface B of the polyester film were 20 nm and 270 nm respectively.

The storing temperatures (T) in the warehouse and during transport and the numbers of storing days (D) in the warehouse and during transport respectively satisfied the relation of said formula (I).

Comparative Example 1

A base film was produced as described for Example 1, except that the very fine silica content of the coating aqueous solution was 0.14 wt %, and that the solid content of the coating aqueous solution was 80 mg/m². As a result, film rolls with 6.3 μm thick films wound were produced. From the films, 6.35 mm wide magnetic tapes were produced.

The properties of the obtained polyester film, the storing temperature and the properties of the magnetic tapes are shown in Table 1. The SRa and SRz of the surface B of the polyester film were 20 nm and 270 nm respectively.

Comparative Example 2

The base film rolls obtained in Example 1 were stored in a warehouse not controlled in temperature in summer for 30 days (D=30). The storing temperature (T) was 38° C. (T=38) on the average. The films of the film rolls were used to produce 6.35 mm wide magnetic tapes as described for Example 1.

The properties of the polyester film, the storing temperature and the properties of the magnetic tapes are shown in Table 1. The SRa and SRz of the surface B of the polyester film were 20 nm and 270 nm respectively.

In this comparative example, the value of the left side (log D) of the formula (I) was 1.477, and the value of the right side (−0.014×T+1.903) was 1.371. In this case, the relation of the formula (I), i.e., left side≦right side did not hold.

Comparative Example 3

The base film rolls obtained in Example 2 were transported in a container not controlled in temperature in summer. The number of storing days (D) during transport was 35

(D=35), and the storing temperature during transport (transport temperature) (T) was 43° C. (T=43) on the average. Then, 6.35 mm magnetic tapes were produced as described for Example 2.

The properties of the obtained polyester film, the storing temperature during transport (transport temperature) and the properties of the magnetic tapes are shown in Table 1. The SRa and SRz of the surface B of the polyester film were 20 nm and 270 nm respectively.

In this comparative example, the value of the left side (log D) of the formula (I) was 1.544, and the value of the right side (−0.014×T+1.903) was 1.301. In this case, the relation of the formula (I), i.e., left side≦right side did not hold.

Comparative Example 4

The base film rolls of Example 1 were stored in a warehouse not controlled in temperature in winter. Then, 6.35 mm wide magnetic tapes were produced as described for Example 1. The storing temperature was 7° C. on the average.

The properties of the obtained polyester film, the storing temperature and the properties of the magnetic tapes are shown in Table 1. The SRa and SRz of the surface B of the polyester film were 20 nm and 270 nm respectively.

Comparative Example 5

The base film rolls of Example 2 were transported in a container not controlled in temperature in winter. Then, 6.35 mm wide magnetic tapes were produced as described for Example 2. The storing temperature during transport (transport temperature) was 4° C. on the average.

The properties of the obtained polyester film, the storing temperature during transport (transport temperature) and the properties of the magnetic tapes are shown in Table 1. The SRa and SRz of the surface B of the polyester film were 20 nm and 270 nm respectively.

TABLE 1

| | Base Film | | | Magnetic Tape Appearing |
|---|---|---|---|---|
| | Ra of Surface A (nm) | Storing Temperature (° C.) | Transport Temperature (° C.) | Frequency of Drop-outs (number/minute) |
| Example 1 | 4 | 19–25 | — | 0 |
| Example 2 | 4 | — | 16–22 | 0 |
| Example 3 | 3 | 19–25 | — | 0 |
| Example 4 | 3 | 19–25 | — | 0 |
| Example 5 | 4 | 19–25 | 16–22 | 0 |
| Comparative Example 1 | 8 | 19–25 | — | 12 |
| Comparative Example 2 | 4 | 36–40 | — | 10 |
| Comparative Example 3 | 4 | — | 36–50 | 15 |
| Comparative Example 4 | 4 | 5–9 | — | 7 |
| Comparative Example 5 | 4 | — | 1–7 | 10 |

What is claimed is:

1. A method for storing a polyester film for a magnetic recording medium, characterized in that a polyester film for a magnetic recording medium having a surface roughness Ra of 6 nm or less on the surface A on one side is stored substantially at a storing atmosphere controlled from 10° C. to 35° C.

2. A method for storing a polyester film for a magnetic recording medium, according to claim 1, wherein the storing temperature T (° C.) and the number of storing days D of such storage satisfy the relationship:

$$\log D \leq -0.014 \times T + 1.903$$

at least in the range from 30° C. to 35° C. in said storing temperature range.

3. A method for storing a polyester film for a magnetic recording medium, according to claim 1, wherein said polyester film has a width of 400 mm or more and a length of 10,000 m or more, and is stored in said storing atmosphere as a film package with the film wound around a bobbin.

4. A method for storing a polyester film for a magnetic recording medium, according to claim 3, wherein said polyester film has a thickness of less than 7.0 μm.

5. A method for storing a polyester film for a magnetic recording medium, according to claim 4, wherein said polyester film is made of polyethylene terephthalate or polyethylene-2,6-naphthalate.

6. A method for storing a polyester film for a magnetic recording medium, according to claim 1, wherein said storage is storage at a stationary position and/or storage during transport.

7. A method for producing a magnetic recording medium, comprising the step of forming a thin ferromagnetic metallic film on said surface A on one side of the polyester film stored according to the method for storing a polyester film for a magnetic recording medium stated in claim 1.

8. A method for producing a magnetic recording medium, according to claim 7, wherein said thin ferromagnetic recording film is formed by vacuum evaporation.

* * * * *